(12) United States Patent
Schoonover et al.

(10) Patent No.: US 6,365,086 B1
(45) Date of Patent: Apr. 2, 2002

(54) METHOD FOR CONNECTING PIECES OF SOLID MATERIAL

(76) Inventors: Christopher A. Schoonover, 1919 Lakewood Ave., Lima, OH (US) 45805; Donald E. Bagent, 7877 Main St., Old Fort, OH (US) 44861

( * ) Notice: Subject to any disclaimer, the term of this patent is extended or adjusted under 35 U.S.C. 154(b) by 0 days.

(21) Appl. No.: 09/303,880

(22) Filed: May 3, 1999

(51) Int. Cl.[7] .................. B29C 45/14; B29C 65/70; B29C 70/84
(52) U.S. Cl. .................. 264/277; 264/261; 264/263
(58) Field of Search .................. 264/261, 263, 264/274, 275, 277, 278, 219

(56) References Cited

U.S. PATENT DOCUMENTS

| | | | | |
|---|---|---|---|---|
| 4,029,728 A | * | 6/1977 | Sharp et al. | 264/278 |
| 4,049,368 A | * | 9/1977 | Grachten | 425/502 |
| 4,183,778 A | * | 1/1980 | Mesnel | 264/261 |
| 4,228,912 A | * | 10/1980 | Harris et al. | 264/261 |
| 4,372,901 A | * | 2/1983 | Kim | 264/261 |
| 4,422,997 A | * | 12/1983 | Machnik | 264/274 |
| 5,069,849 A | * | 12/1991 | Wain | 264/263 |
| 5,120,480 A | * | 6/1992 | Anderson | 264/219 |
| 5,648,036 A | * | 7/1997 | Glang et al. | 264/261 |

* cited by examiner

*Primary Examiner*—Angela Ortiz
(74) *Attorney, Agent, or Firm*—Jerry Semer

(57) ABSTRACT

The invention is basically a method of connecting two pieces of material with a molded object in between them. This method is basically done by a mold in which the material can be inserted within. In the preferred embodiment, the applicant is creating a frame in which all four corners are molded. In this embodiment the framing material forming the sides is inserted into the corner molds. The plastic then is injected or put in the molds. When the plastic hardens and the materials taken out of the molds, one has a frame in which the four corners have been molded and the framing pieces are securely attached to the four corners. In the preferred embodiment, to more securely attach the corner pieces to the molded corner, the framing material forming the sides has predrilled openings. This forms a more secure attachment between the molding corner and the material forming the sides of the frame.

7 Claims, 13 Drawing Sheets

METHOD FOR CONNECTING PIECES OF SOLID MATERIAL

BACKGROUND OF INVENTION

Most large appliances today are shipped to the consumers on devices called shipping bases. These shipping bases today are usually made out of wood that has been stapled or nailed together. The first problem with these bases is that the base usually has to be made out of virgin wood and not out of recycled products. Thus, one of the objectives of this invention is to create a shipping base that can be made entirely out of recycled or waste products. Secondly, the base is assembled usually with fasteners such as staples. If these staples are not driven flush with the wood, they will bend and break causing projections and exposed points that injure individuals and destroy or damage a floor over which the appliance is moved. Thus, another objective of this invention is to create a shipping base that does not have to be put together with staples or fasteners and thus, remains smooth and will not damage objects over which it moves. The staples or fasteners, if they are not driven flush, could also catch on the machinery and conveyor belts that are used in the process of making the shipping base and placing it under the appliance. This, of course, would cause damage to expensive machinery and also could stop the automated process and thus, cost money in production. Thus, another objective of the invention is to create a shipping base which does not need fasteners nor staples and will easily be assimilated into the now automated process of placing the shipping base on the appliance and moving the appliance through the line without fear of the shipping base catching on machinery and the conveyor belts over which it passes.

The use of virgin wood also causes many other problems. The composition of wood is inconsistent. It sometimes splinters, or there could be excessive warpage, and the joints could be weakened from other problems such as knots or holes in the wood. To overcome these problems, particle board or a plywood could be used, however, as pointed out above, these woods are usually not used to form a shipping base since it is difficult to bond these products to form a shipping base in an automated process. Thus, one of the objectives of this invention is to create a shipping base that would allow for the use of particle board and plywood and other material made from recycled material. Virgin wood, due to the problems of splintering, warpage and inconsistent composition requires large dimensional tolerances. One of the objectives of this invention is to create a shipping base that can be easily and inexpensively fit within a small tolerance and thus, more easily moved through an automated process.

These problems have been known in industry for many years. One of the ways to solve these problems is to create a totally plastic shipping base. However, a totally plastic shipping base would be extremely expensive due to the material and the time it would take to make it. Thus, as pointed out above, shipping bases today are still made of virgin wood.

It is also difficult with an all virgin wood shipping base to make alterations on the wood base to accommodate for wheels or feet on the appliance. Thus, on the objectives of this invention is to create a method to create a shipping base in which clearance holes or clearance cut outs for wheels or feet or other such items can easily be incorporated into the shipping base. Also with virgin wood shipping base, it is difficult to add items such as cutouts for an edge or corner protection items. Thus, an objective of the invention is to create a shipping base that has a flexibility to add items like locating devices for edge or corner protection items.

The features of this invention that allows it to meet the objectives put forth above are that the corners of the shipping base are molded with an insertion mold process. Thus, a shipping base can be created that can be made out of totally recyclable material. Also this shipping base can be made out of plywood or particle board from waste material. The corners of the shipping base are plastic and can be formed from recyclable plastics. This method will produce a strong shipping base that can be made with a small tolerance and is very inexpensive.

By using molded corners, there are a lot of other advantages. The molded corners allow for extremely close tolerances. The corners, due to their molding, always remain the same and the same distance apart. However, the inserted pieces can vary in dimension considerably. It is just necessary to place the pieces in the mold further if it is longer or not as far if it is shorter. Also, the mold allows for openings to be placed in the mold for feet or wheels of the appliance. There can also be cut out sections of the mold to also meet the clearance for feet or wheels or other items that stick out of the bottom of the appliance. Also, locating devices can be added to the mold to located items such as corner protection items.

One of the disadvantages of the shipping base made out of virgin wood is that a great portion of the shipping base rest on the floor and thus, makes it difficult to move the shipping base over a horizontal surface. Thus, one of the objectives of the invention is to create a shipping base with feet so it can be easily moves over the floor.

One of the advantages of this method for making a shipping base is that the tolerances of the base can be kept very small. Since the corners are all molded out, their tolerance is extreme small. However, since the insertion pieces are inserted in the mold, they can have rather large tolerances since they can just stick a little further or a little shorter into the mold and still keep the tolerances of the overall base very small. This creates a large advantage because it allows recycled material to be used which may not meet tolerance standards.

Summary of the Invention

The invention is basically a method of connecting two pieces of material with a molded object in between them. This method is basically done by a mold in which the material can be inserted within. In the preferred embodiment, the applicant is creating a frame in which all four corners are molded. In this embodiment the framing material forming the sides is inserted into the corner molds. The plastic then is injected or put in the molds. When the plastic hardens and the materials taken out of the molds, one has a frame in which the four corners have been molded and the framing pieces are securely attached to the four corners. In the preferred embodiment, to more securely attach the corner pieces to the molded corner, the framing material forming the sides has predrilled openings. This forms a more secure attachment between the molded corner and the material forming the sides of the frame.

DETAILED DESCRIPTION OF THE PREFERRED EMBODIMENT

Figure 1:
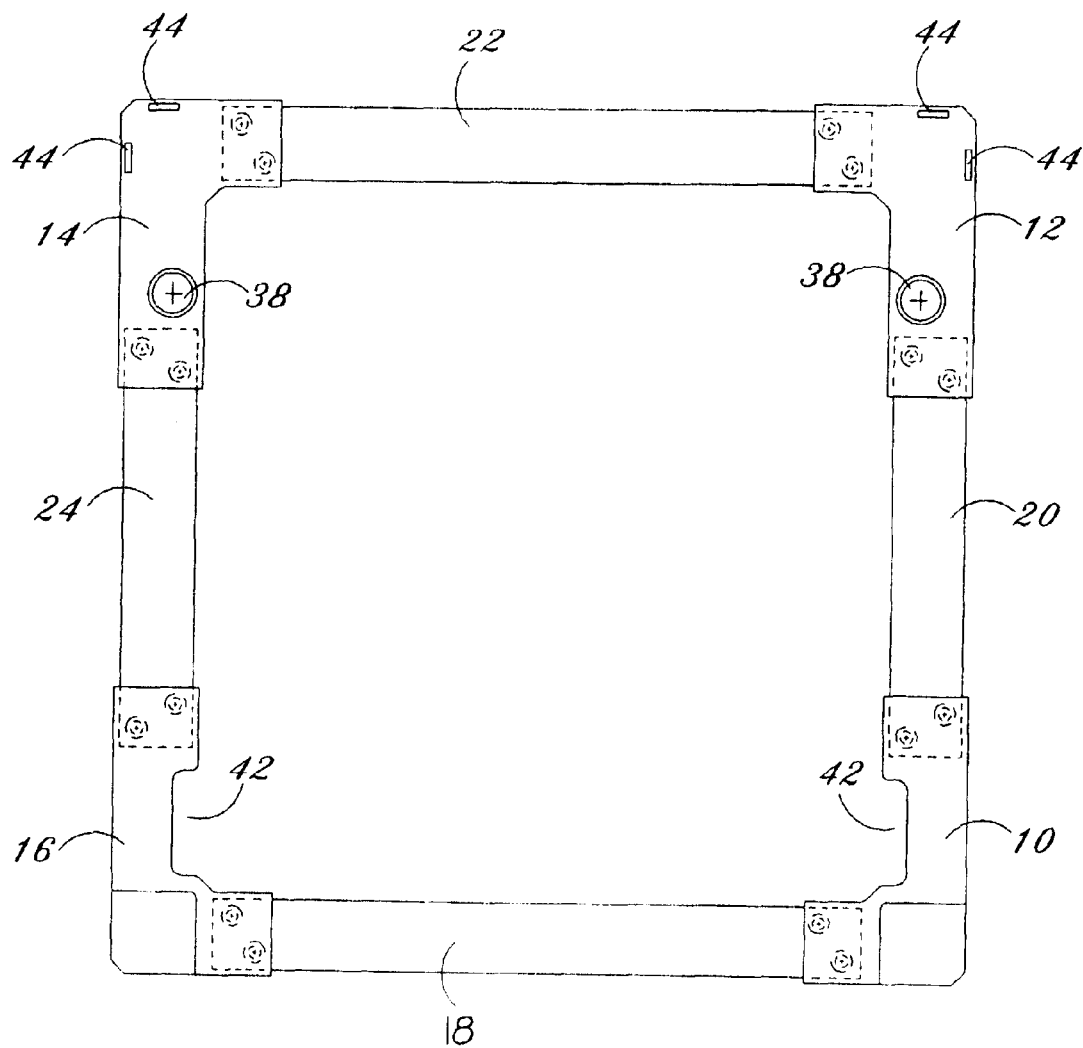
FIG. 1 is a top view of a shipping base.
Figure 2:
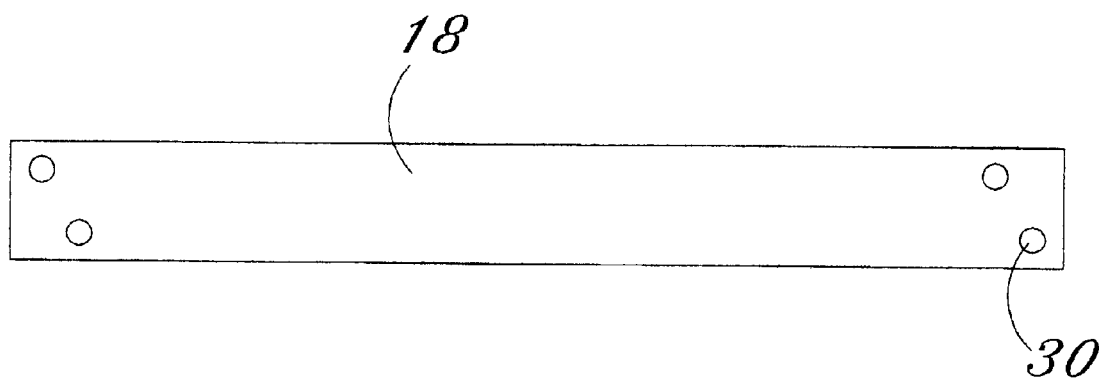
FIG. 2 is a top view of a framing piece.
Figure 3:
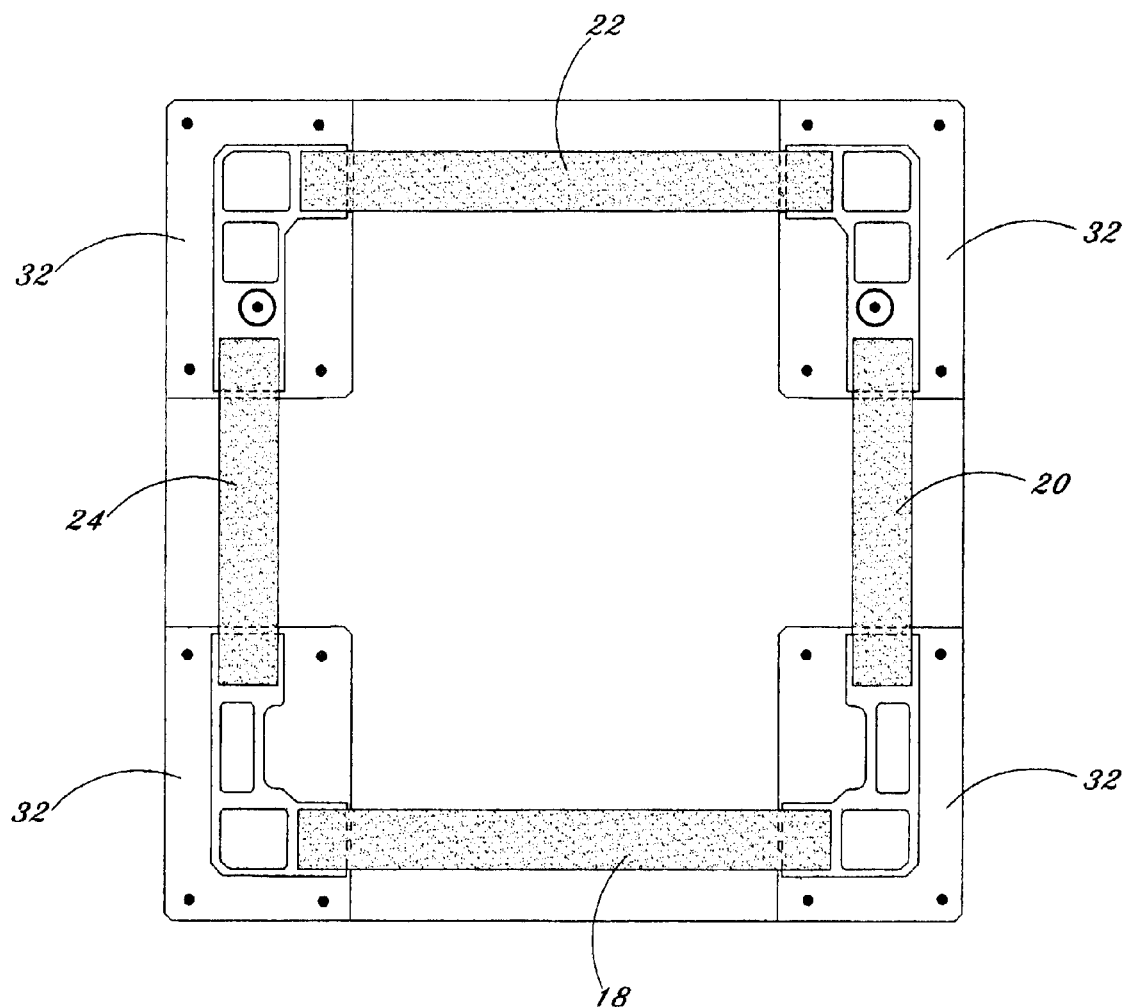
FIG. 3 is a section of the mold.

FIG. 1 shows a shipping base that has been created by the inventor's process for connecting pieces of material. In FIG. 1 you see that the four corners 10, 12, 14 and 16, have been molded and these corners are attached together by framing pieces 18, 20, 22 and 24. FIG. 2 shows a framing piece 18 with openings 30 that have been drilled to begin the process. FIG. 3 is the mold with the framing pieces 18, 20, 22 and 24 inserted into the molds 32 which form the corners 10, 12, 14 and 16 of the shipping base. All four framing pieces 18, 20, 22 and 24 are inserted into the molds 32. Plastic is then injected or poured into the molds 32 to form the corners 10, 12, 14 and 16. The plastic in the mold 32 flows around the inserted framing piece 18 and into the openings 30 in the framing pieces. Once the plastic hardens, it forms a strong connection with the framing pieces 18, 20, 22 and 24. The framing pieces 18, 20, 22 and 24 can be made out of almost any type of material that can withstand the temperature of the melted, molded plastic and is of sufficient strength to do the job. These pieces could be made out of metal or wood or plastic. One of the advantages of this process is that these framing pieces 18, 20, 22 and 24 can be made out of almost any material. Thus, they could be made out of recycled or waste material such as particle boards, recycled plastic or plywood. The plastic in the mold can also be made out of recycled material. This is especially true in the case of a shipping base since the color of the plastic is not important.

Figure 4:
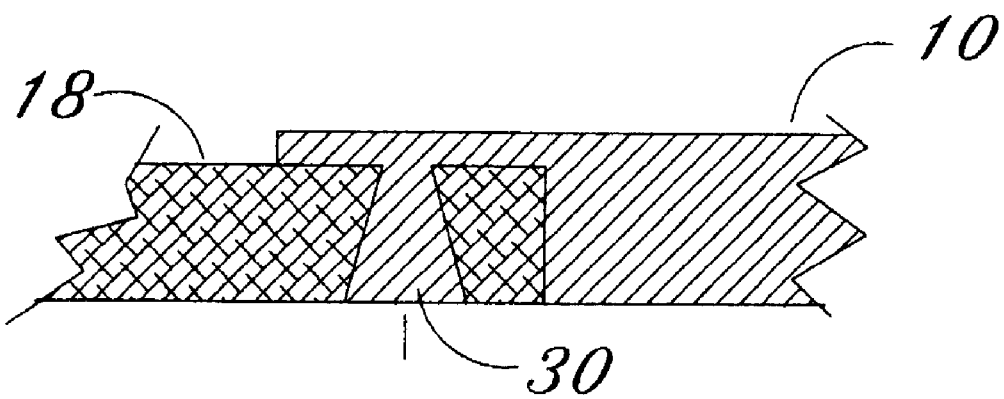
FIG. 4 a cut away of an embodiment of the joint.
Figure 5:
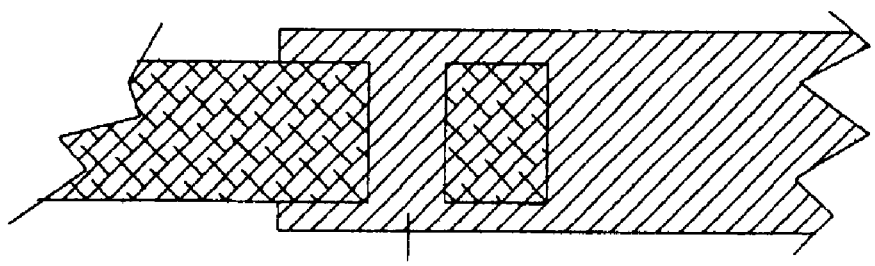
FIG. 5 a cut away of another embodiment of the joint.
Figure 6:
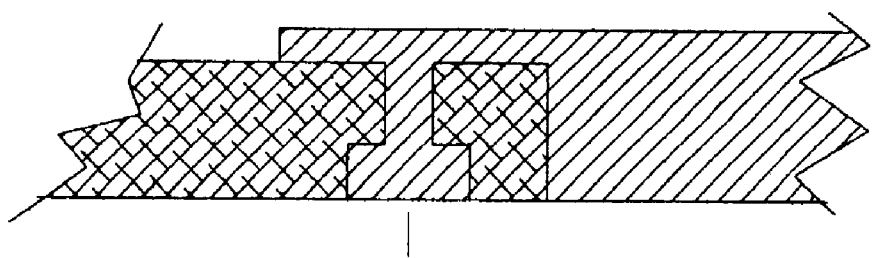
FIG. 6 a cut away of a third embodiment of the joint.

FIG. 4 shows a cross section of the joint formed between the corner 10 and the inserted framing piece 18. In FIG. 4 one can see that the openings 30 drilled in the framing piece 18 were flared. The reason for the flare was to increase the area and to make the joint stronger. These openings 30 can take many different shapes as shown in FIGS. 4, 5 and 6. In the preferred embodiment, the openings were placed in the framing pieces by drilling. However, these openings can be placed in the framing pieces by many different ways known in the art. The opening 30 can be a straight, drilled opening as shown in FIG. 5. The opening 30 can also be tapered as shown in FIG. 4. By tapering the opening the area of contact between the framing piece and the plastic increases. FIG. 4 shows the openings in the preferred embodiment of the shipping base. FIG. 6 also shows another design for the openings 36. In FIG. 6 the opening 36 is T-shaped. Here again the opening creates a much larger area for the plastic to make contact with the framing piece, thus, making the joint stronger. With some plastics and framing materials, it would not be necessary to have the openings. These plastics and framing materials would have enough cohesiveness to form a strong joint without the openings. However, by placing the openings in the framing material, one can increase the different types of plastic and the different types of framing materials used.

The molding can be done by injection molding. This would allow the molded corners and the shipping base to be quickly and cheaply manufactured. However, several other types of molding could be used. The corners could also be cast.

To make the shipping base, the molds 32 are basically placed on a movable conveyor belt. As the mold 32 moves along the conveyor belt the framing pieces 16, 20, 22, and 24 of the shipping base are inserted into the molds 32. Then the mold 32 will roll under the plastic injection machine which will make contact with the mold 32 and inject the plastic into the mold 32. The mold 32 then rolls out of the plastic injection machine and the plastic cools and the shipping base is removed from the mold 32 and the mold 23 is sent back on the conveyor to make another shipping base.

Also, by using molded corners you can mold these corners into any shape which is necessary. Thus, the shipping base can accommodate wheels on the appliances or feet. This is shown in FIG. 1. FIG. 1 shows an opening 38 placed in two of the corners which could accommodate wheels or other items protruding from the bottom of the appliance. The other two corners are also cut away to accommodate wheels or feet or other items protruding from the bottom of the appliance. Cut aways 42 are shown in the other two corners. One also sees smaller openings 44 in two of the corners. These smaller openings 44 were designed for locating devices for the edge or corners protection items. Other openings could be placed in the mold as necessary. Also, the mold 32 as shown in FIG. 3 does not have to make the entire corner out of a rectangular piece of plastic. Indentions can be placed in the mold to lessen the amount of plastic necessary, thus, lowering the price.

Figure 7:
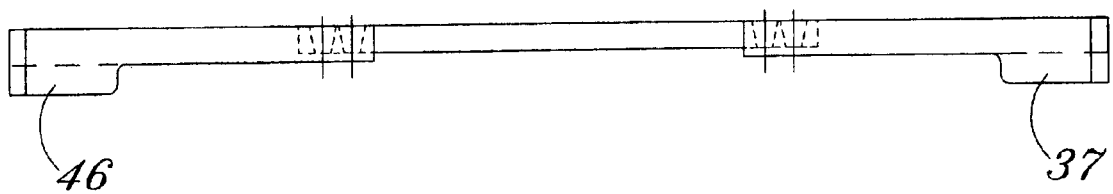
FIG. 7 a side view of a shipping base.

FIG. 7 shows a side view of the invention. FIG. 7 shows that the shipping base itself has feet 46 and 48. This is a tremendous advantage over shipping bases of the prior art. The feet 46 and 48 are designed to hold the shipping base slightly off the ground. By lowering the area of contact with the ground as to the shipping base makes it easier to push over a surface. It also holds the appliance slightly off the ground when the appliance is kept in storage.

Figure 8:
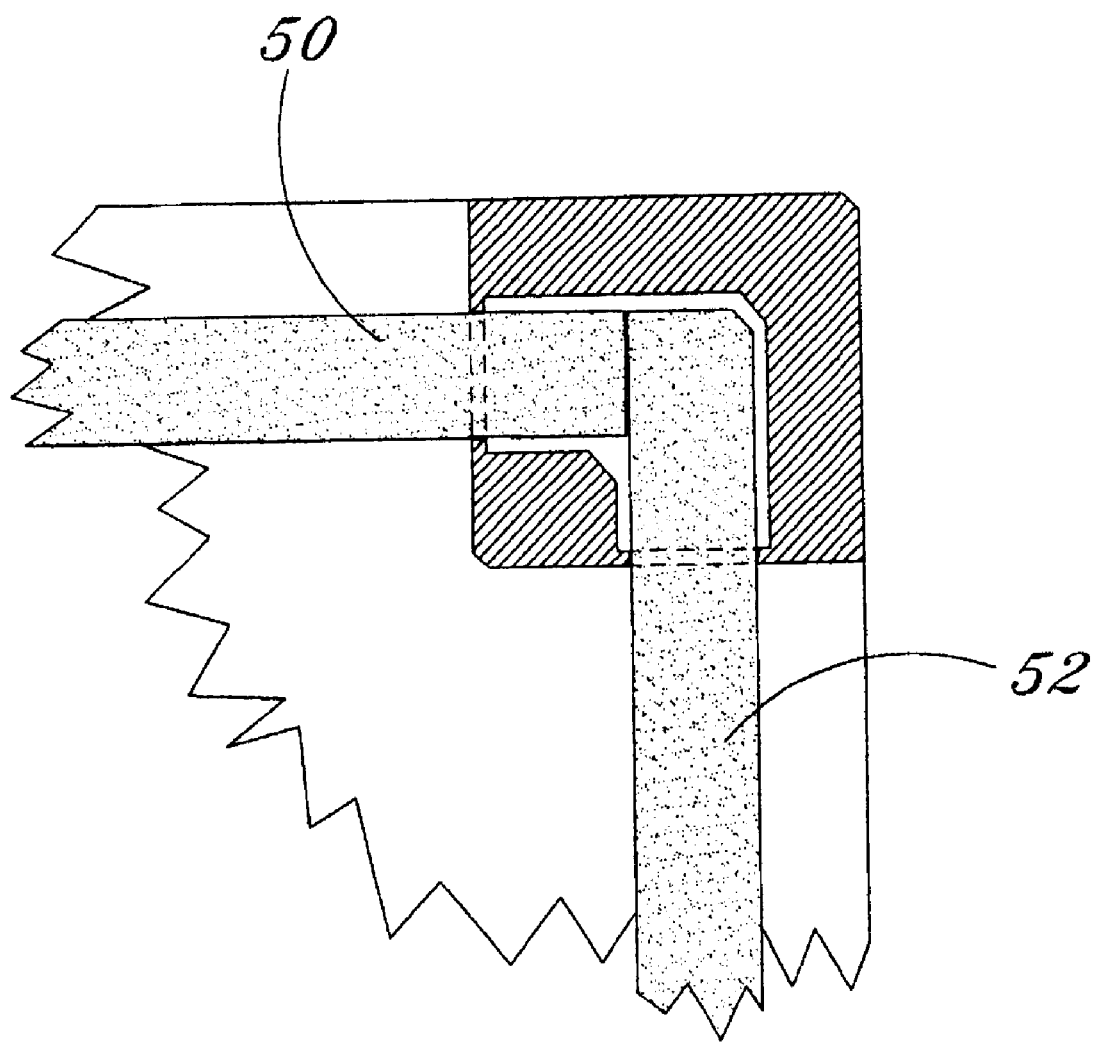
FIG. 8 a cut away view of another embodiment of the joint.

FIG. 8 shows another way in which the corner of the shipping base can be made. In FIG. 8 the framing pieces 50 and 52 abut next to each other. This will also form a strong corner. FIG. 8 shows a corner made by a square mold. However, the mold could take many different shapes and could also be designed like the molds in FIG. 1 to accommodate feet and other cutaways. In FIG. 8, the framing pieces 50 and 52 are inserted in a mold and nearly touch each other. Plastic is then poured or injected into the mold around the inserted pieces to former the corner shown in FIG. 8.

Figure 9:
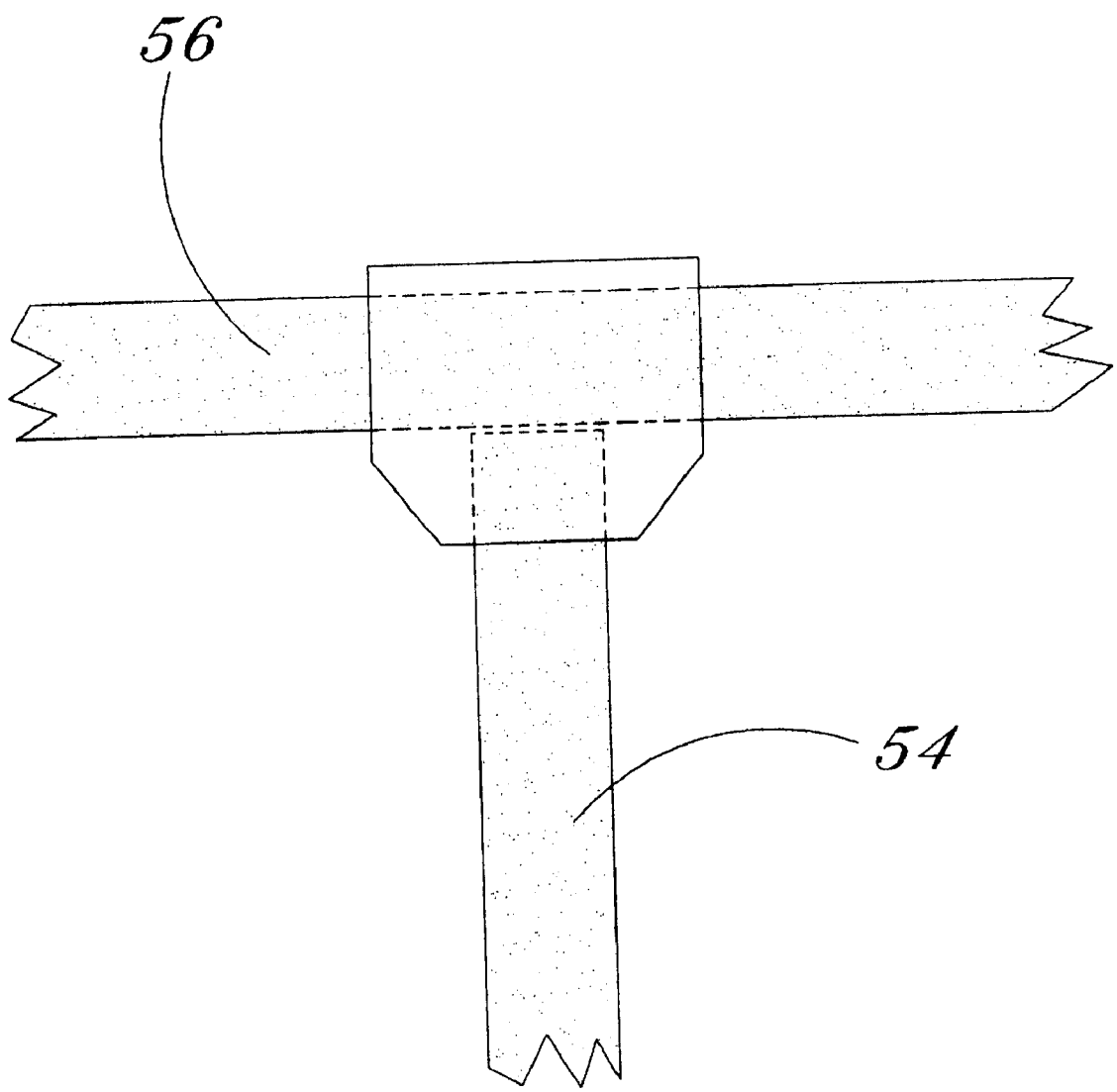
FIG. 9 a cut away view of another embodiment of the joint.

FIG. 9 shows another way in which two pieces 54 and 56 can be connected together through a mold. In this figure, the one piece 54 is not attached to the end of the other piece 56 but rather the middle of the other piece 56. Like the molds in the previous embodiments, the mold of FIG. 9 can take up many different shapes and can be formed to accommodate cutaways and other necessary items. In FIG. 9 the insertion piece 56 passes completely through the mold. The other insertion piece 54 is inserted into the mold. In the preferred embodiment this piece 54 is inserted so it nearly abuts piece 56. The plastic is then poured or injected into the mold to form the connection between the two pieces. As in the previous embodiment the insertion pieces of FIG. 8 and FIG. 9 can be drilled or cut in different shapes to increase their contact with the plastic and to form a stronger connection.

Figure 10:
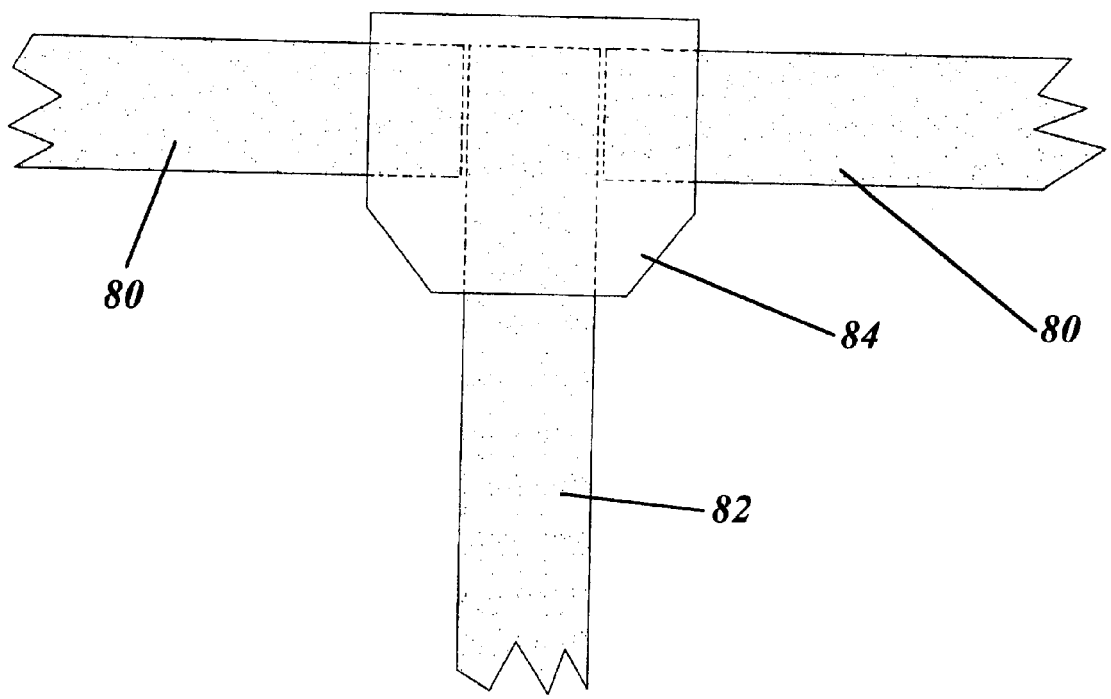
FIG. 10 a cut away view of another embodiment of the joint.
Figure 11:
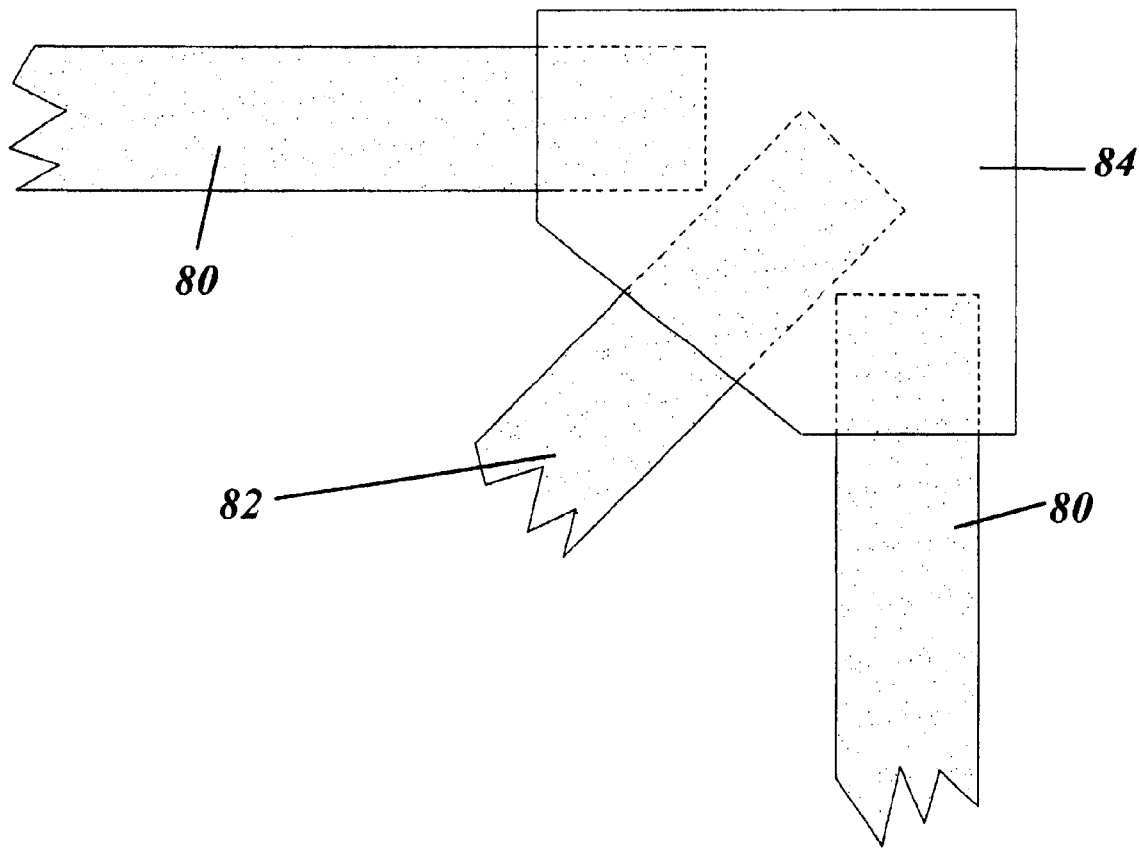
FIG. 11 a cut away view of another embodiment of the joint.
Figure 12:
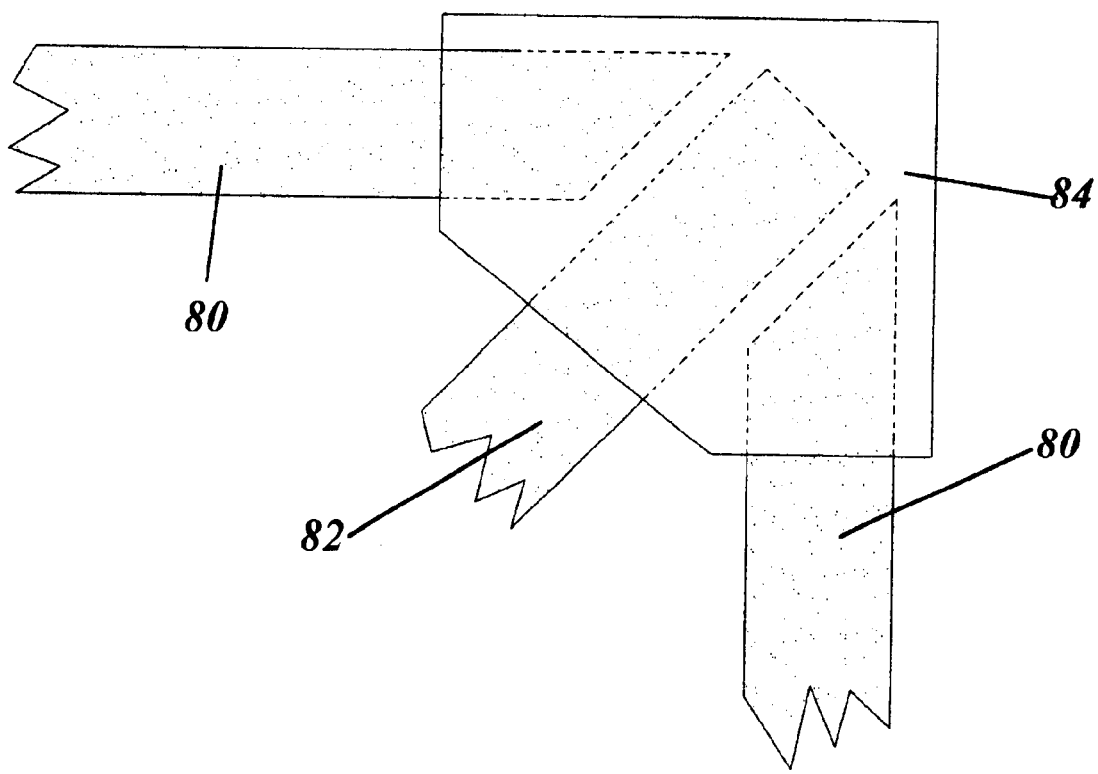
FIG. 12 a cut away view of another embodiment of the joint.

FIGS. 10, 11 and 12 shows three ways in which three pieces can be attached together. FIG. 10 shows three pieces being attached in a "T" shape. The insertion pieces 80 and 82 are inserted into the mold so they almost abut each other. The plastic is then poured or injected around them to form the corner as shown in FIG. 10. The area of the plastic 84 shown in FIG. 10 can take many different shapes. As in the previous embodiment, cutouts can be made in this area and this area can be designed in almost any shape that a mold can be created.

FIG. 11 and FIG. 12 shows three pieces being connected together to form a corner with a bracing piece 82. The insertion piece 80 that form the corner are inserted into the mold with the bracing piece 82. The plastic is then poured or injected into the mold to connect the three pieces. The plastic area 86 can take many different shapes just as in the previous embodiment and can be formed with cutouts. The insertion pieces can also take many different shapes. In FIG. 11, they are all squared at the end. In FIG. 12, they are cut on a taper. As in the previous embodiments the insertion openings could be made in the insertion pieces to enlarge the area which the plastic makes contact with the pieces and thus, increase the strength of the joint.

Figure 13:
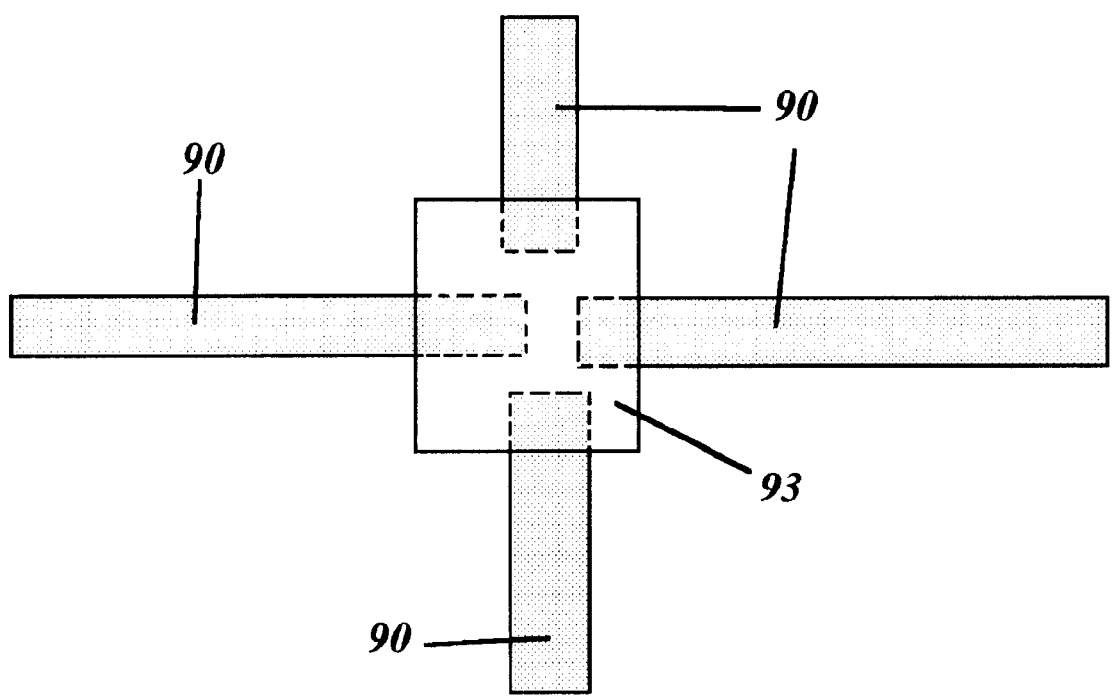
FIG. 13 a cut away view of another embodiment of the joint.

FIG. 13 shows the way in which four insertion pieces could be attached together. In the embodiment in FIG. 13 the insertion pieces 90 are inserted into the mold and the plastic is poured or injected around these pieces to form the connection. In FIG. 13 the four pieces are connected together in a "+" Shape. However, these four pieces could be connected together in several different shapes. As in the previous embodiment, the area of plastic 93 could also take many different shapes as necessary for the connection. Also as in the previous embodiment the insertion pieces could be drilled or shaped in many different configurations. These configurations could be designed to increase the area of contact between the insertion place in the plastic, thus, strengthening the joint.

Figure 14:
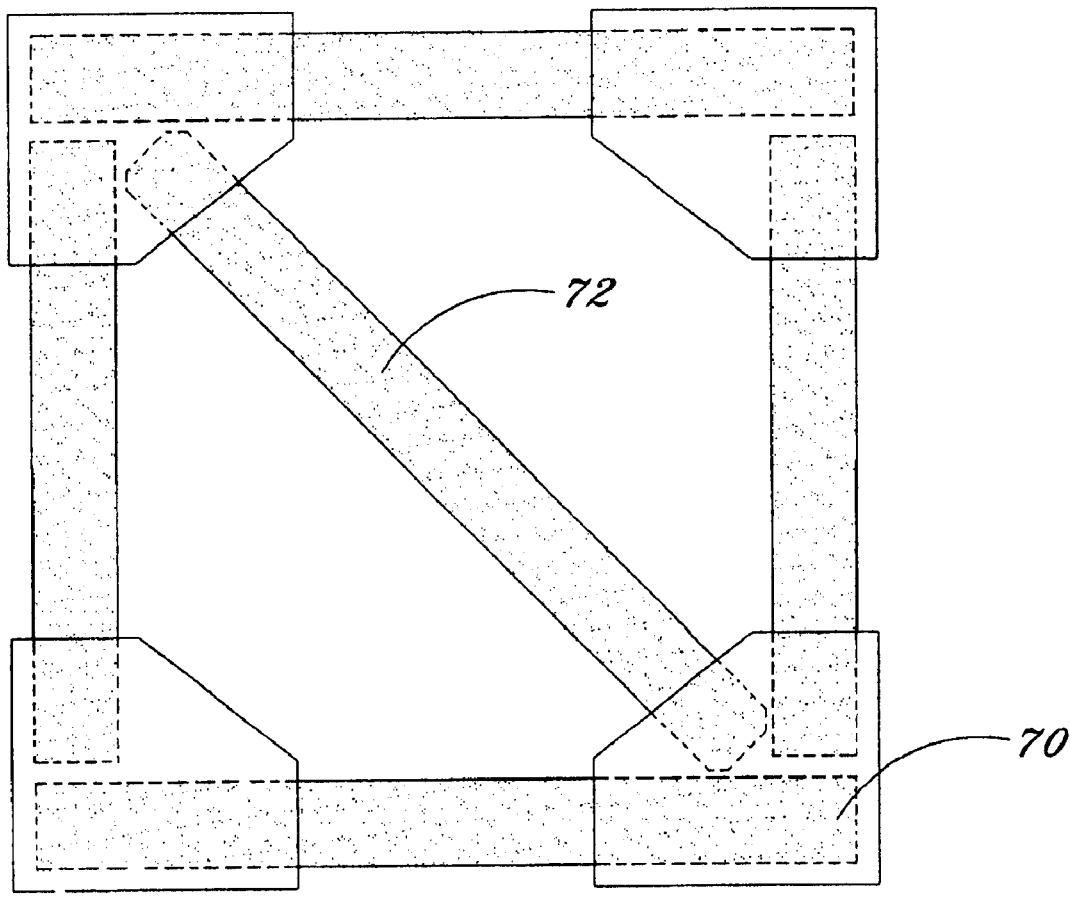
FIG. 14 a top view of another embodiment of the shipping base.
Figure 15:
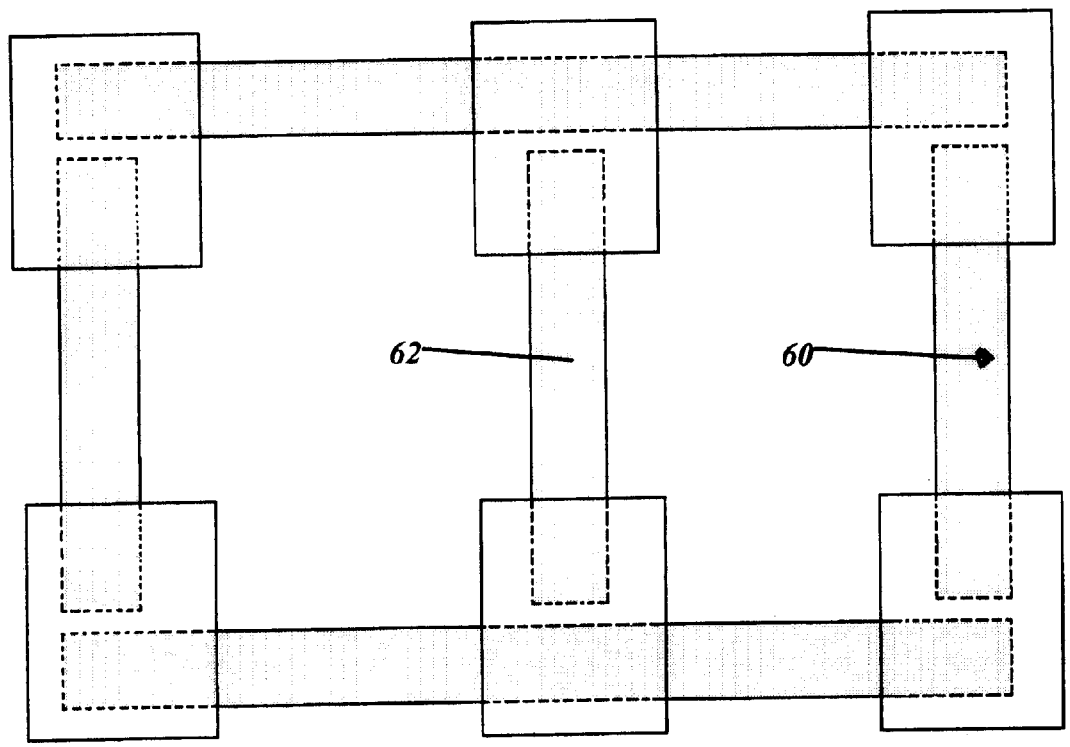
FIG. 15 a top view of another embodiment of the shipping base.

By attaching multiple pieces together one can create a shipping base with reinforcement pieces. In FIG. 14, the shipping base 60 has a reinforcing piece 62 running through the middle of the shipping base. This reinforcing piece 62 is attached similar to the piece of FIG. 8. FIG. 15 shows the reinforcement piece 72 running triangularly through the center of the shipping base 70. This reinforcement piece 72 is attached very similar to the pieces of FIG. 9. This reinforcement piece 72 can also be attached similar to the pieces of FIGS. 10, 11 and 12.

Changes and modifications in the specificity described embodiments can be carried out without departing from the scope of the invention which is intended to limited only by the scope of the appending claims.

What is claimed is:

1. A process for producing a shipping base for an item comprising:
   a. using a mold which allows for at least three pieces of nonflexible material to be inserted within said mold; and,
   b. locating the mold on a platform; and,
   c. inserting the pieces of material into the mold such that the mold forms the corners of a frame such that the pieces of material inserted into the mold form the sides of the frame and are of sufficient strength that they can form and be used as the sides of a shipping base without breaking; and,
   d. moving the mold to a site for the addition of plastic to the mold; and,
   e. adding sufficient amount of plastic to the mold and said plastic flows around the ends and sides of the material such that the plastic forms the corners of the frame and the pieces of nonflexible material inserted into the mold to form sides of the frame and the plastic is of sufficient strength that when the frame is used as a shipping base it will not break and the bond between the plastic and the material is of sufficient strength that when the frame is used as a shipping base the plastic and the nonflexible material will not pull apart; and,
   f. moving the mold past the site where plastic is added; and
   g. waiting for the plastic to begin to harden; and,
   h. removing the frame from the mold.

2. A process for producing shipping base for an item as in claim 1 wherein:
   a. the mold is designed to create a shipping base with openings to accommodate protrusions from the bottom of the item.

3. A process for producing shipping base for an item as in claim 1 wherein:
   a. the mold is designed to create a shipping base with cut outs to accommodate protrusions from the bottom of the item.

4. A process for producing shipping base for an item as in claim 1 wherein:
   a. the mold is designed to create a shipping base with opening for locating devices to accommodate edges of corner protectors.

5. A process for connecting pieces of material as in claim 1 further comprising the step of:
   a. shaping the portion of the material tat is inserted into the mold and makes contact with the plastic so that the binding strength between the plastic and the material is increased and thus, forms a stronger connection between the pieces of material.

6. A process for connecting pieces of material as in claim 5 wherein:
   a. The shaping of the portion of material that is inserted into the mold comprises the step of:
      (1.) Creating openings in the portion of material that is inserted into the mold in one or more places.

7. A process for connecting pieces of material as in claim 6 wherein:
   a. the creating of openings in the portion of the material that is inserted into the mold is by boring.

* * * * *